Oct. 2, 1962   W. E. WOOLLENWEBER, JR., ETAL   3,056,634
BEARING STRUCTURE

Filed Aug. 3, 1959   5 Sheets-Sheet 1

INVENTORS.
JAMES A. HARDY.
GEPHARD PAUL.
BY WILLIAM E. WOOLLENWEBER, JR.

Lockwood, Woodard, Smith & Weikart.
ATTORNEYS.

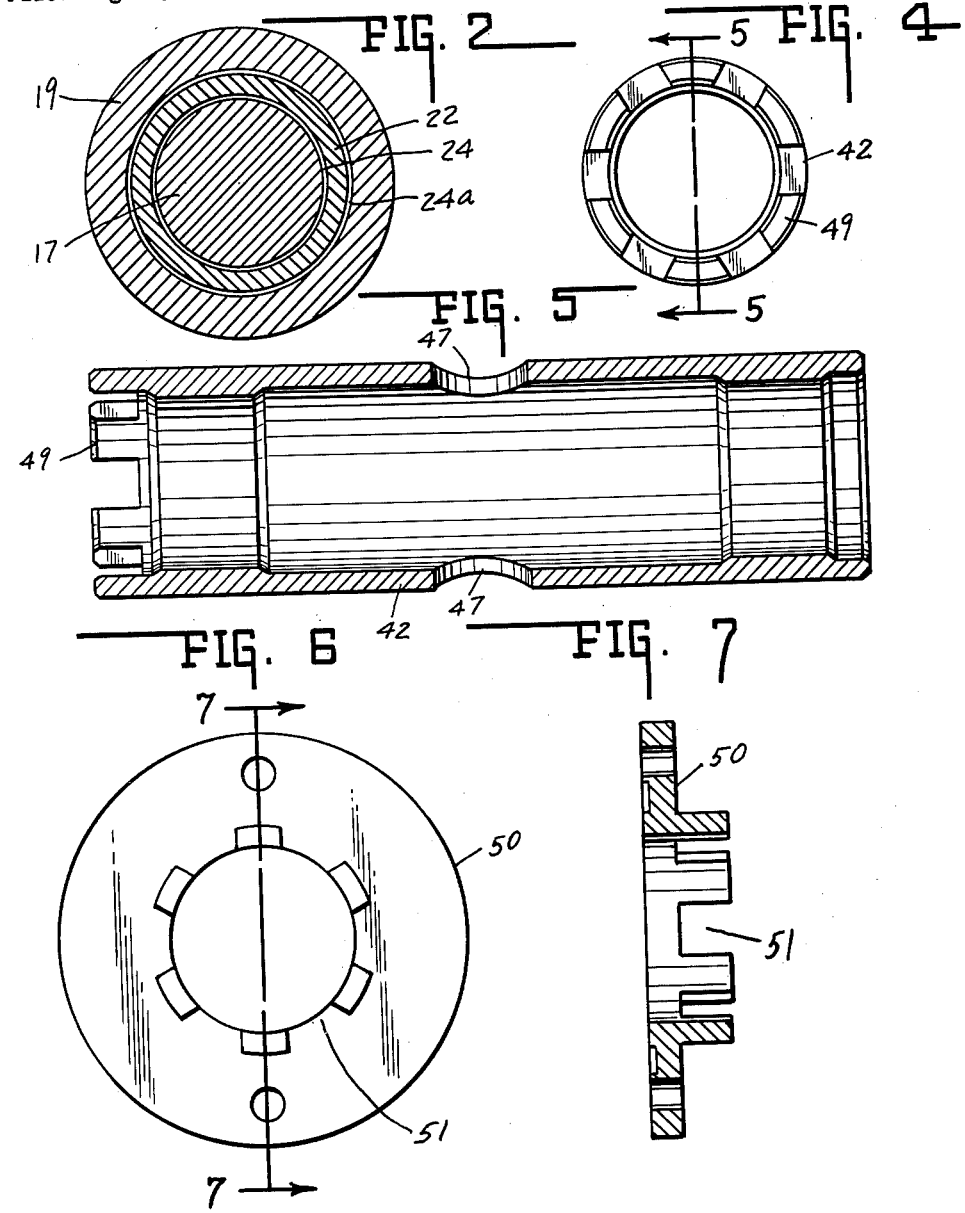

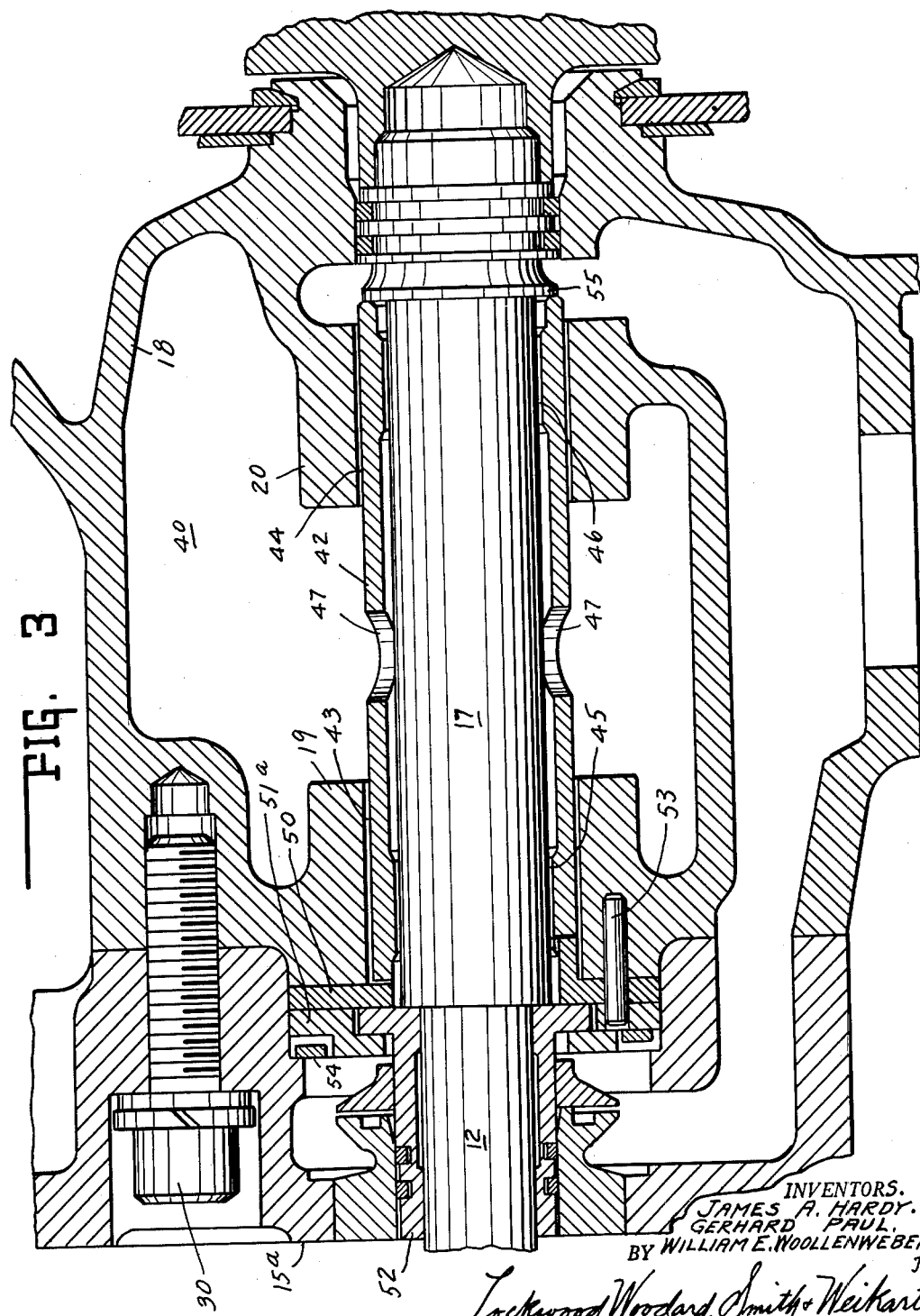

Oct. 2, 1962 W. E. WOOLLENWEBER, JR., ETAL 3,056,634
BEARING STRUCTURE
Filed Aug. 3, 1959 5 Sheets-Sheet 4
FIG. 8
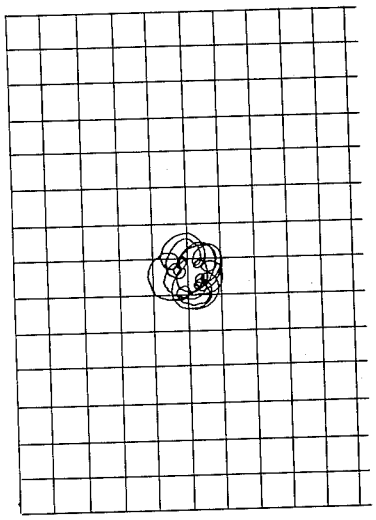
50,000 R.P.M.
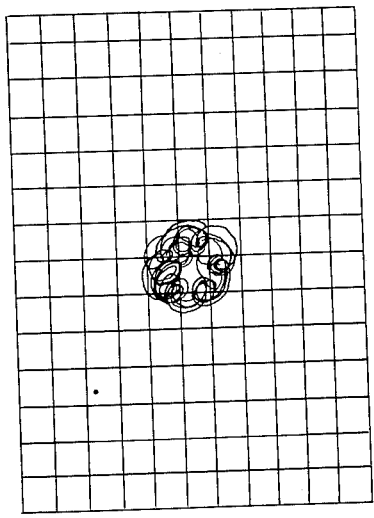
60,000 R.P.M.
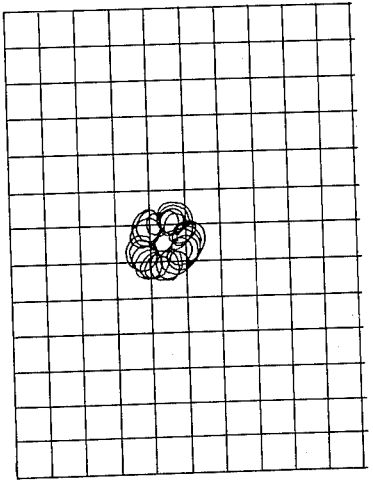
70,000 R.P.M.
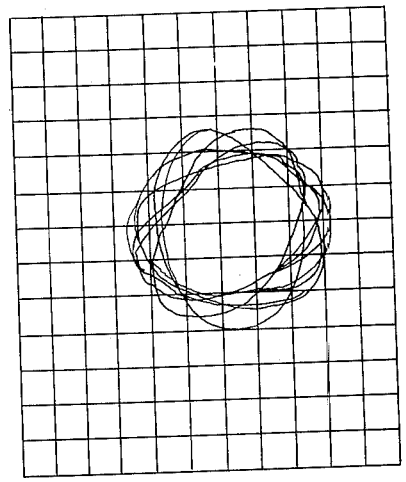
78,000 R.P.M.
INVENTORS.
JAMES A. HARDY.
GERHARD PAUL.
BY WILLIAM E. WOOLLENWEBER, JR
*Lockwood, Woodard, Smith & Weikart.*
ATTORNEYS.

FIG. 9
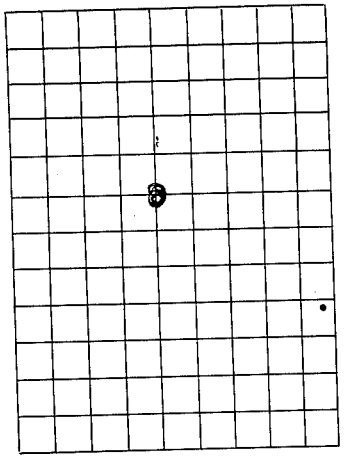
50,000 R.P.M.
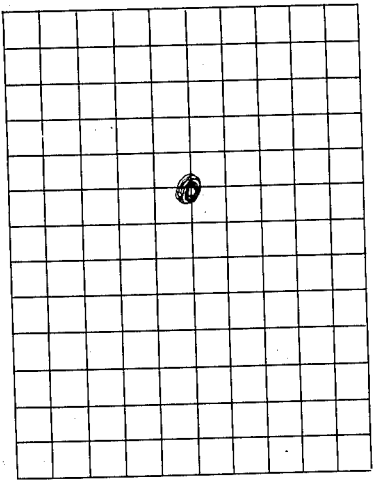
60,000 R.P.M.
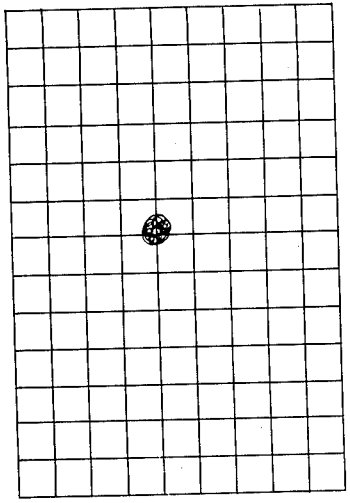
70,000 R.P.M.
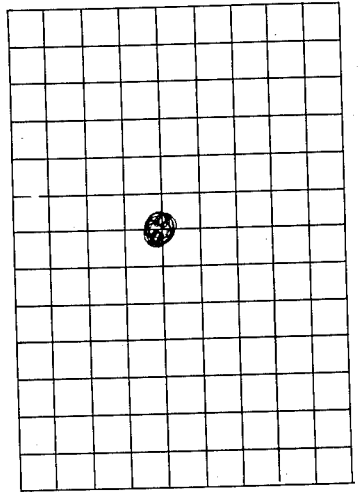
80,000 R.P.M.
INVENTORS.
JAMES A. HARDY,
GERHARD PAUL.
BY WILLIAM E. WOOLLENWEBER, JR.
Lockwood, Woodard, Smith & Weikart.
ATTORNEYS.

United States Patent Office 3,056,634
Patented Oct. 2, 1962

3,056,634
BEARING STRUCTURE
William E. Woollenweber, Jr., Columbus, and James A. Hardy and Gerhard Paul, Indianapolis, Ind., assignors to Schwitzer Corporation, Indianapolis, Ind., a corporation
Filed Aug. 3, 1959, Ser. No. 831,234
5 Claims. (Cl. 308—73)

This invention relates generally to bearing structures and more particularly it relates to bearings especially adapted for use in high speed machinery, such for example, as high speed air compressing devices.

It is conventional to provide, in high speed machinery, anti friction bearings and such bearings permit relatively high speed of shaft rotation. For example, speeds of the order of 60,000 to 80,000 revolutions per minute are attainable. However, such bearings have limited life of the order of 500 hours. Such limited life is tolerable in military aircraft applications where it is customary to repair or rebuild much of the mechanical equipment of the aircraft periodically, and after rather short periods of time. Such limited life is not tolerable in commercial applications.

High speed machinery, such as turbine driven air compressors for supercharging internal combustion engines, has been adopted widely for use on engines used for driving automobile trucks, tractors and as stationary power sources. For these applications of turbine driven compressors the bearing structure must be adaptable to mass production methods and must be economical to manufacture. Also, such bearing structure must have relatively long life and must not be subject to break down at relatively short intervals. Anti friction bearings for high speed machinery are excessively expensive and have too short an operating life for application to turbine driven air compressors used on internal combustion engines of the type previously described.

It is also conventional to provide sleeve bearings for high speed machinery of all types including turbine driven air compressors. However, the speed of rotation of such machinery has been limited because of the inability of sleeve bearings to tolerate a practical degree of unbalance in the rotating parts. Conventional sleeve bearings are also objectionable in that they are incapable of damping resonant vibrations of the rotating parts at critical speeds.

It has been conventional practice to equip internal combustion engines with air compressors for the purpose of increasing the power output of the engines by increasing the quantity of air fed to the combustion chamber of the engines. Rotational speeds of approximately 50,000 revolutions per minute have been tolerable with conventional sleeve bearings, but there is a constant demand for more power output from present internal combustion engines and one way of accomplishing such increase of power output without redesigning the engine is by increasing the rotational speed of the air input compressor. The phenomenon of "oil film whirl" or "shaft whipping" has prevented increase of rotational speeds because this phenomenon in the journal bearings causes the shaft to whirl or whip instead of rotating about a stationary center. This phenomena is described in "Mechanical Vibrations" by Den Hartog, 2d edition, published in 1940 by McGraw-Hill Publishing Company, Inc. The shaft whirls in such a manner that its center travels through a circular or modified circular path. Bearing clearances limit such whirling motion, but at speeds of the order of 80,000 revolutions per minute or more, it is found that the load on the bearing and the lubricating oil film dynamics are such that the oil film breaks down, thereby causing metal to metal contact and rapid wear of the bearings.

When operating speeds of rotating machinery are increased beyond present conventional levels, excessive oil film whirl may be prevented to a degree by having relatively small clearances between the bearing and the journal. With such clearance, the rotating shaft has little or no freedom to move from the geometric center of the bearing. However, it is found that conventional sleeve bearings are still not satisfactory when clearances are so reduced.

Accordingly, the principal object of this invention is to provide a bearing structure for high speed machinery of such nature that shaft whirl is reduced to a minimum.

Another object of this invention is to provide a bearing structure which will permit substantial increase of normal operating speed of rotation of high speed machinery.

Still another object of this invention is to provide a bearing structure for high speed machinery which will tolerate unbalance in the rotating parts thereof.

Still another object of this invention is to provide a bearing structure inherently capable of providing relatively large damping effect and consequent suppression of vibration of rotating parts.

A further object of this invention is to provide a bearing structure for accomplishing the foregoing objects and of such nature that it may be substituted for bearing structures of existing machinery without alteration of the component parts of such machinery.

In accordance with this invention there is provided a bearing structure for high speed machinery comprising a bearing housing having at least one journal box, a bushing mounted within said journal box and having substantial clearance with respect thereto, a shaft having a bearing surface disposed within said bushing, said bushing having an internal diameter somewhat larger than the diameter of said shaft, means for inhibiting rotation of said bushing with respect to said journal box, and a source of lubricant under pressure for creating a film of lubricant between said bushing and said journal box and a film of lubricant between said bushing and said shaft.

The full nature of the invention will be understood from the accompanying drawings and the following description and claims:

FIG. 2 is a cross-section taken on line 2—2 of FIG. 1.

FIG. 3 is an enlarged longitudinal cross-section of the bearing housing illustrated in FIG. 1 and illustrating a modification of the sleeve bearing of this invention.

FIG. 4 is an end view of the bearing sleeve illustrated in FIG. 3.

FIG. 5 is a cross-section taken on line 5—5 of FIG. 4.

FIG. 6 is a plan view of the thrust washer shown in FIG. 3 for preventing rotation of the sleeve bearing.

FIG. 7 is a cross-section taken on line 7—7 of FIG. 6.

FIG. 8 is a graphical illustration of shaft motion in a conventional bearing structure at speeds of 50,000 r.p.m., 60,000 r.p.m., 70,000 r.p.m. and 78,000 r.p.m. respectively.

FIG. 9 is a graphical illustration of shaft motion in a bearing structure embodying the invention, at the indicated speeds, and illustrating the stabilizing ability of this invention to suppress large amplitude of whirl of the shaft center.

Figure 1:
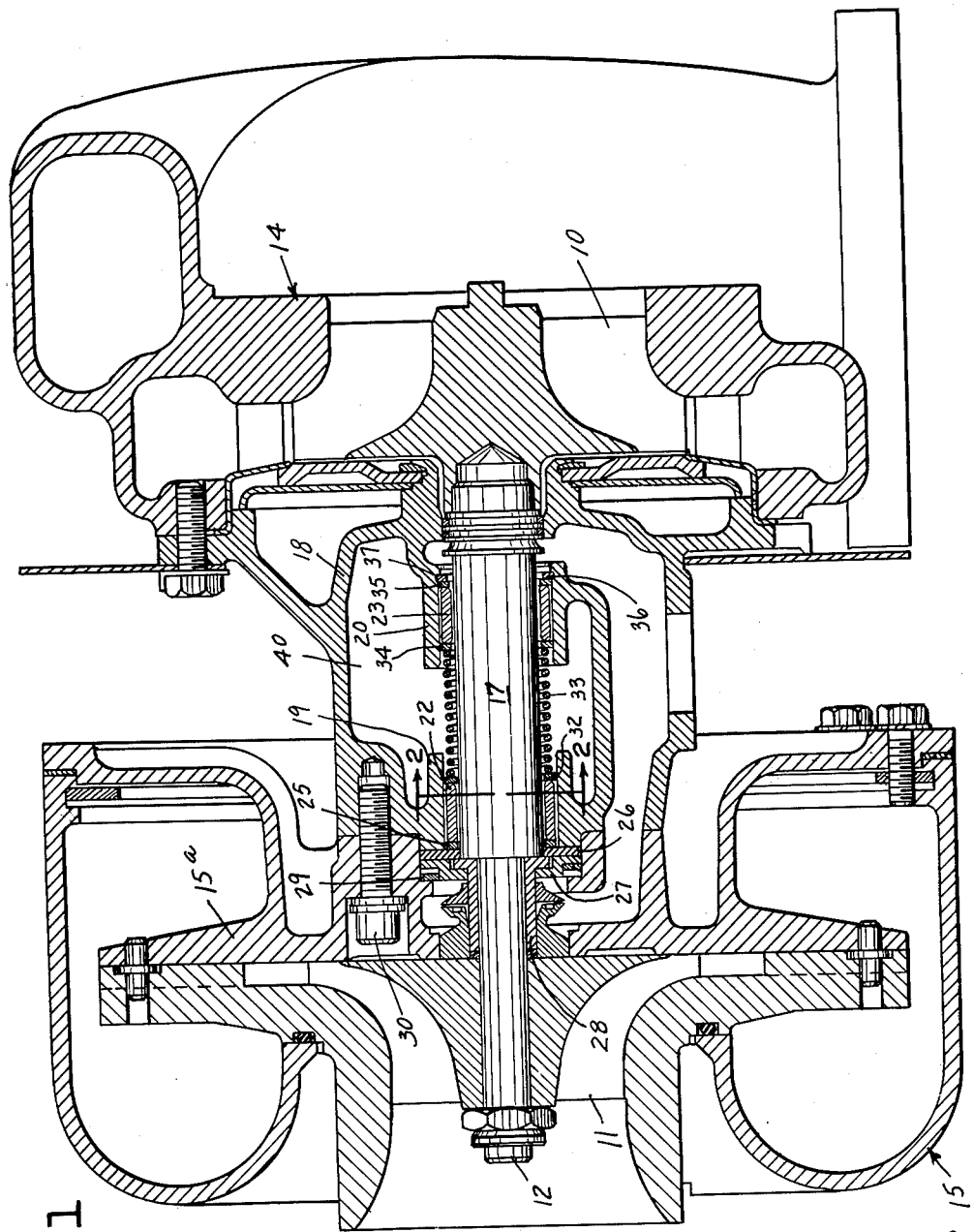
FIG. 1 is a longitudinal cross-section of an air compressing device embodying the bearing structure of this invention.

Referring to FIG. 1 of the drawings the invention is illustrated as a part of a turbine driven high speed centrifugal air compressor, but it will be readily understood by those skilled in the art, that this invention may be applied to many other forms of high speed machinery. The centrifugal air compressor wheel 11 is driven by a radial inflow turbine wheel 10 mounted on the common shaft 12 in conventional manner. The turbine wheel 10 cooperates with a housing and nozzle ring generally indicated at 14 having chambers designed in conventional manner so that wheel 10 may provide power to drive the centrifugal air compressor wheel 11, which in turn cooperates with a housing generally indicated at 15 having chambers of such character that rotation of wheel 11 will provide compressed air.

In accordance with this invention, the shaft 12 includes a journal portion 17 which is supported for rotation within a bearing housing 18 having journal boxes 19 and 20 for accommodating sleeve bearings or bushings 22 and 23 respectively. It is an important feature of this invention to provide substantial clearance between shaft 17 and the internal surfaces of bushings 22 and 23, as at 24 (FIG. 2) and likewise to provide substantial clearance between the internal surfaces of journal boxes 19 and 20 and the external surfaces of bushings 22 and 23, as at 24a. This permits the bushings to float on films of lubricant with respect to the shaft and the journal boxes.

The bushing 22 may be retained in the position shown in FIG. 1 by a first thrust washer 25, a second thrust washer 26, a third thrust washer 27, a rotatable thrust collar 28 and a wave spring 29, members 26, 27 and 29 being clamped to the bearing housing 19 by a capscrew 30 acting through the section 15a of outer housing 15. There is also provided a thrust washer 32 against which is seated a coil spring 33. Coiled spring 33 also seats on a thrust washer 34 thereby to exert pressure on the other bushing 23. Thrust washer 35 and snap ring 36 seated within a groove 37 in journal box 20 serve to retain all parts in proper alignment within journal boxes 19 and 20.

For providing oil films between the bushings and the shaft and particularly the bushings and the journal boxes, the bearing housing is formed to have an oil reservoir or chamber 40 into which oil may be fed under pressure.

In operation, shaft 17 is driven by the radial inflow turbine 10 with the exhaust gas from an internal combustion engine. The clearance between the bushings and the shaft and between the bushings and the journal boxes permit oil or other lubricant to form films between the shaft and the bushings, and between the bushings and the journal boxes. Thus, the bushings tend to float between the oil films.

When the bushings float freely between the oil films it is found that there is excessive oil film whirl and shaft whip as illustrated by FIG. 8. Tests have been made by means of electrical testing apparatus, including an oscilloscope. Each of the graphs in FIG. 8 represents the fluorescent screen of an oscilloscope on which is illustrated by the whirling lines the trace formed on the fluorescent screen by the electron beam. The trace of the electron beam represents the shaft whip which occurs at speeds of 50,000 r.p.m., 60,000 r.p.m., 70,000 r.p.m., and 78,000 r.p.m., in conventional turbine apparatus using bearings having bushings which are free to float between the oil films. At 50,000 r.p.m. the degree of shaft whip is not excessive, but at 78,000 r.p.m. the phenomena of oil film whirl causes excessive shaft whip to the extent that the oil films break down and cause rapid wear and destruction of the bearing.

The coil spring 33 functions to exert end-loading on the bushings 22 and 23 in the form of pressure or restraining torque sufficient to prevent them from rotating to any substantial degree. As a result, the shaft rotates at relatively high speed with respect to the bushings, and the bushings rotate at relatively low speed with respect to the journal boxes. While the coil spring is illustrated and described herein as a means of creating such end-loading and restraining torque, it is intended that any means for creating such end-loading and restraining torque shall be within the scope of this invention. For example, spring force, oil pressure or any other restraining means is adaptable to this invention so long as the restraining torque on the bushing is sufficient to reduce the speed of rotation of the bushing to such a value that oil film whirl does not develop on the outside of the bushing. It should be further understood that it is within the scope of this invention to provide restraining torque other than end-loading on the bushing. For example, such restraining torque may be applied to any portion of the bushing including the outer bearing surface thereof.

The structure described herein is found to permit speeds of rotation that heretofore have been impossible without encountering destructive whirling action of the shaft in conventional bearings or free floating bushings. FIG. 9 of the drawings also represents the trace of an electron beam on the screen of an oscilloscope by representing tests made on the bearing of this invention. FIG. 9 shows that the application of end-loading or restraining torque by means of the coil spring 33 reduces oil film whirl to such an extent that shaft whip is negligible. It will be noted that the trace of the cathode ray beam in FIG. 9 is greatly reduced in amplitude as compared with FIG. 8. This reduction in amplitude provides clear indication that the degree of shaft whip at speeds of from 50,000 r.p.m. to 80,000 r.p.m. is never sufficient to cause oil film whirl or to cause breakdown of the oil films. In other words, the movement of the shaft and the bushings never exceeds the clearances between the journal box, the bushings, and the shaft.

FIG. 3 of the drawings illustrates another modification of this invention wherein there is provided a sleeve or bushing 42 mounted within the bearing housing 18 in journals 19 and 20. Sleeve 42 is a unitary element made of suitable bearing material and having clearance with respect to journal boxes 19 and 20 as shown at 43 and 44. The shaft 17 also has clearance with respect to the bushing 42 as indicated at 45 and 46. As previously described in connection with FIG. 1 oil or other lubricant from chamber 40 creates a film within the clearance spaces 43, 44, 45 and 46 so that the bushing floats between journal boxes 19 and 20 and shaft 17. It will be clear that the oil film within spaces 45 and 46 is provided by a flow of oil from chamber 40 through the apertures 47 in bushing 42.

Referring to FIGS. 4, 5, 6 and 7, the bushing 42 is prevented from rotating by slotting the left hand end of the bushing to form a plurality of teeth 49. A thrust washer 50 is provided with slots 51 for receiving the teeth 49 and is clamped in fixed relation to the journal box 19 by means of the thrust washer 51a and outer housing section 15a, as previously described in connection with FIG. 1. Washers 50 and 51a are locked against rotation by means of a locking pin 53 extending through the washers and into the journal box 19 as shown in FIG. 3. The opposite end of bushing 42 bears on a flange 55 formed on shaft 17. Tests of this modification of the invention show results substantially identical with or indistinguishable from the results shown in FIG. 9, and therefore, this figure of the drawings also illustrates that this modification of the invention also prevents excessive oil film whirl and the resulting damage to the bushing and bearing surfaces.

From the foregoing description, it will be apparent that this invention provides a bearing structure capable of tolerating high speeds of rotation in various types of machines. FIGS. 8 and 9 of the drawings clearly illustrate the increase of speed of rotation which is obtainable in accordance with this invention. It should be understood, however, that the upper limits of speed obtainable by the bearing structure of this invention are still unknown. This is because of the fact that it has not been feasible to test turbine structures embodying this invention at speeds in excess of 80,000 r.p.m., because of the fact that the turbine wheel structure would not withstand higher speeds. The phenomenon of oil film whirl is reduced to a negligible quantity whereby breakdown of the film of lubricant is eliminated. Also, the necessity for relatively small clearance is eliminated so that the effects of centrifugal force do not cause excessive bearing loads. Furthermore, any slight unbalance in rotating parts is in effect neutralized by the special design of the bearing structure since the flexibility of the system allows the rotor to find and rotate about its true center of gravity.

This invention has the further advantage that it renders bearing structures relatively insensitive to oil pressure, oil temperature and oil viscosity. Conventional bearing structures are very sensitive to these factors insofar as oil film whirl is concerned. Experimental tests show that the bearing structure of this invention prevents oil film whirl and shaft whip through wide ranges of oil pressure, oil temperature and oil viscosity.

The results described herein are accomplished in part by means of the floating relationship of the bushing to the journal box and the shaft. This permits greater radial freedom of movement of the shaft because of the double oil film inside and outside of the bushing. The clearances between the bushing and the shaft on the one hand and between the bushing and the journal box on the other hand can be kept small enough to control oil film whirl. However, such clearances provide sufficient radial freedom to tolerate a greater amount of unbalance in the rotating parts than can be tolerated with a fixed bushing. Furthermore floating bushings provide a relatively large degree of damping to suppress vibration of the rotating parts. It is particularly to be noted that this invention provides a means for preventing any substantial degree of rotation of the bushing. Consequently, oil film whirl does not develop on the outside of the bushing and because of this, a wide range of clearance is possible between the outer surface of the bushing and the journal box. The outer oil film also helps to suppress any tendency for whirl to develop between the shaft and the bushing.

While this invention has been disclosed with particular reference to centrifugal air compressors directly connected by a common shaft to a turbine, it will be readily understood that the invention is not to be limited to use in any specialized type of machinery, but is applicable to many different types of high speed machinery.

The invention claimed is:

1. A bearing structure for high speed machinery comprising a bearing housing having spaced and aligned journal boxes, a shaft disposed within said journal boxes, a pair of bushing members mounted over said shaft in alignment with said journal boxes, said bushing members having substantial clearance with respect to said shaft and said journal boxes, said bearing housing being formed to provide a chamber communicating with the clearance spaces between said bushings, said journal boxes and said shaft, said chamber providing a lubricant reservoir for supplying a film of lubricant within said clearance spaces, and a coil spring mounted over said shaft and bearing on the facing ends of said bushings for inhibiting rotation of said bushings with respect to said journal boxes.

2. A bearing structure for high speed machinery comprising a bearing housing having spaced and aligned journal boxes, a shaft disposed within said journal boxes, a pair of bushing members mounted over said shaft in alignment with said journal boxes, said bushing members having substantial clearance with respect to said shaft and said journal boxes, said bearing housing being formed to provide a chamber communicating with the clearance spaces between said bushings, said journal boxes and said shaft, said chamber providing a lubricant reservoir for supplying a film of lubricant within said clearance spaces, and resilient means bearing on the facing ends of said bushings for inhibiting rotation of said bushings with respect to said journal boxes.

3. A bearing structure for high speed machinery comprising a bearing housing having spaced and aligned journal boxes, a shaft disposed within said journal boxes, a pair of bushing members mounted over said shaft in alignment with said journal boxes, said bushing members having substantial clearance with respect to said shaft and said journal boxes, a source of lubricant under pressure communicating with the clearance spaces between said bushings, said journal boxes and said shaft to provide a film of lubricant within said clearance spaces, and a coil spring mounted over said shaft and bearing on the facing ends of said bushings for inhibiting rotation of said bushings with respect to said journal boxes.

4. A bearing structure for high speed machinery comprising a bearing housing having a journal box, a shaft disposed within said journal box, a bushing member mounted over said shaft in alignment with said journal box, said bushing member having substantial clearance with respect to said shaft and said journal box, said housing being formed to provide a lubricant chamber communicating with the clearance spaces between said bushing, said journal box and said shaft, to provide a film of lubricant within said clearance spaces, and resilient means in said chamber and bearing on said bushing for inhibiting rotation of said bushing with respect to said journal box.

5. A bearing structure for high speed machinery comprising a bearing housing having a journal box, a shaft disposed within said journal box, a bushing member mounted over said shaft in alignment with said journal box, said bushing member having substantial clearance with respect to said shaft and said journal box, said housing being formed to provide a lubricant chamber communicating with the clearance spaces between said bushing, said journal box and said shaft, to provide a film of lubricant within said clearance spaces, and means in said chamber and engaging said bushing member endwise thereof at multiple points for inhibiting rotation of said bushing with respect to said journal box.

References Cited in the file of this patent

UNITED STATES PATENTS

| | | |
|---|---|---|
| 1,020,423 | Hewitt | Mar. 19, 1912 |
| 2,532,795 | Underwood et al. | Dec. 5, 1950 |
| 2,908,533 | Schurr et al. | Oct. 13, 1959 |